United States Patent
Chang

(10) Patent No.: US 6,728,249 B2
(45) Date of Patent: *Apr. 27, 2004

(54) SYSTEM AND METHOD FOR PERFORMING CUT-THROUGH FORWARDING IN AN ATM NETWORK SUPPORTING LAN EMULATION

(75) Inventor: Chi-Hua Chang, Milpitas, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,608

(22) Filed: Jun. 25, 1999

(65) Prior Publication Data

US 2003/0123448 A1 Jul. 3, 2003

Related U.S. Application Data

(60) Provisional application No. 60/090,939, filed on Jun. 27, 1998.

(51) Int. Cl.[7] ............................................... H04L 12/56
(52) U.S. Cl. .................................................. 370/395.3
(58) Field of Search ........................... 370/351, 395.53, 370/389, 400, 409, 395.1; 709/249, 250, 201, 203; 711/101, 108

(56) References Cited

U.S. PATENT DOCUMENTS

| | | |
|---|---|---|
| 4,024,507 A | 5/1977 | Berkling et al. |
| 4,586,134 A | 4/1986 | Norstedt |
| 4,700,294 A | 10/1987 | Haynes |
| 5,218,687 A | 6/1993 | Ducuosso et al. |
| 5,287,537 A | 2/1994 | Newmark et al. |
| 5,295,135 A | 3/1994 | Kammerl |

(List continued on next page.)

OTHER PUBLICATIONS

"LAN Emulation Over ATM Version 2—LUNI Specification". The ATM Forum. AF–LANE–0084.00. Jul. 1997. Pp. 24–27 and 92.*

Passmore et al. "The Virtual LAN Technology Report". Decisys, Inc. Copyright 1996. Pp. 1–20.*

"ATM Internetworking". Cisco System, Inc. Copyright May, 1995. Pp. 25–49.*

(List continued on next page.)

*Primary Examiner*—Chi Pham
*Assistant Examiner*—Derrick W. Ferris
(74) *Attorney, Agent, or Firm*—Blakely, Sokoloff, Taylor & Zafman LLP

(57) ABSTRACT

System and method in a network processor for performing cut-through forwarding of LANE packets without incurring the overhead associated with LANE protocol stack assisted routing. A content addressable memory (CAM) stores LEC uplink information including mapping between MAC destination addresses and VCC information. The network processor also stores LEC information table for corresponding VLAN identifiers and LECs. The LEC information table includes LEC ID information for the VLAN ID. For a LANE packet received from Ethernet and outbound to ATM destination, the network processor determines the LEC ID for the packet and then performs a CAM lookup to determine VCC information for the packet. The packet is then forwarded using the LEC ID and VCC information. For a LANE packet received from an ATM source and outbound to the Ethernet, the network processor determines the interface address of the packet. Based on the interface address, the network processor determines if the packet is a echoed or loopback packet or if its destination is the network processor itself. The packet is then routed to via the Ethernet if it is not a loopback or echo packet and the destination is not the network processor.

12 Claims, 5 Drawing Sheets

U.S. PATENT DOCUMENTS

| | | |
|---|---|---|
| 5,379,297 A | 1/1995 | Glover et al. |
| 5,394,402 A * | 2/1995 | Ross ..................... 370/402 |
| 5,414,707 A | 5/1995 | Johnston et al. |
| 5,481,536 A | 1/1996 | Reisch et al. |
| 5,515,370 A | 5/1996 | Rau |
| 5,517,488 A | 5/1996 | Miyazaki et al. |
| 5,535,201 A | 7/1996 | Zheng |
| 5,539,729 A | 7/1996 | Bodnar |
| 5,555,256 A | 9/1996 | Calamvokis |
| 5,555,265 A | 9/1996 | Kakuma et al. |
| 5,564,051 A | 10/1996 | Halliwell et al. |
| 5,574,875 A | 11/1996 | Stansfield et al. |
| 5,590,128 A | 12/1996 | Maloney et al. |
| 5,619,650 A | 4/1997 | Bach et al. |
| 5,638,371 A | 6/1997 | Raychaudhuri et al. |
| 5,640,399 A | 6/1997 | Rostoker et al. |
| 5,652,872 A | 7/1997 | Richter et al. |
| 5,659,794 A | 8/1997 | Caldarale et al. |
| 5,664,116 A | 9/1997 | Gaytan et al. |
| 5,684,797 A | 11/1997 | Aznar et al. |
| 5,684,954 A | 11/1997 | Kaiserswerth et al. |
| 5,696,930 A | 12/1997 | Garetz et al. |
| 5,701,300 A | 12/1997 | Jeon et al. |
| 5,726,985 A | 3/1998 | Daniel et al. |
| 5,740,171 A | 4/1998 | Mazzola et al. |
| 5,742,772 A | 4/1998 | Sreenan |
| 5,745,477 A | 4/1998 | Zheng et al. |
| 5,745,790 A | 4/1998 | Oskouy |
| 5,748,630 A | 5/1998 | Bergantino et al. |
| 5,751,709 A | 5/1998 | Rathnavelu |
| 5,751,951 A | 5/1998 | Osborne et al. |
| 5,751,955 A | 5/1998 | Sonnier et al. |
| 5,754,530 A | 5/1998 | Awdeh et al. |
| 5,764,895 A | 6/1998 | Chung |
| 5,771,231 A | 6/1998 | Watanabe |
| 5,796,715 A | 8/1998 | Patterson et al. |
| 5,796,978 A | 8/1998 | Yoshioka et al. |
| 5,805,805 A | 9/1998 | Civanlar et al. |
| 5,812,550 A | 9/1998 | Sohn et al. |
| 5,825,765 A | 10/1998 | Menzilcioglu et al. |
| 5,835,928 A | 11/1998 | Auslander et al. |
| 5,841,772 A | 11/1998 | Daniel et al. |
| 5,848,068 A | 12/1998 | Daniel et al. |
| 5,857,075 A | 1/1999 | Chung |
| 5,867,712 A | 2/1999 | Shaw et al. |
| 5,870,561 A | 2/1999 | Jarvis et al. |
| 5,875,173 A | 2/1999 | Ohgane et al. |
| 5,878,232 A | 3/1999 | Marimuthu |
| 5,905,874 A | 5/1999 | Johnson |
| 5,909,441 A | 6/1999 | Alexander, Jr. et al. |
| 5,910,955 A | 6/1999 | Nishimura et al. |
| 5,912,892 A | 6/1999 | Barnhart et al. |
| 5,935,249 A | 8/1999 | Stern et al. |
| 5,943,693 A | 8/1999 | Barth |
| 5,956,336 A | 9/1999 | Loschke et al. |
| 5,974,457 A | 10/1999 | Waclawsky et al. |
| 5,974,462 A | 10/1999 | Aman et al. |
| 5,978,951 A * | 11/1999 | Lawler et al. ............... 370/392 |
| 5,983,332 A | 11/1999 | Watkins |
| 5,991,854 A | 11/1999 | Watkins |
| 6,003,027 A | 12/1999 | Prager |
| 6,005,943 A | 12/1999 | Cohen et al. |
| 6,021,263 A | 2/2000 | Kujoory et al. |
| 6,041,059 A | 3/2000 | Joffe et al. |
| 6,052,383 A * | 4/2000 | Stoner et al. .......... 370/395.53 |
| 6,058,434 A | 5/2000 | Wilt et al. |
| 6,064,675 A * | 5/2000 | Alexander et al. .......... 370/401 |
| 6,073,175 A | 6/2000 | Tavs et al. |
| 6,085,252 A | 7/2000 | Zhu et al. |
| 6,104,700 A | 8/2000 | Haddock et al. |
| 6,119,170 A | 9/2000 | Schoffelman et al. |
| 6,144,996 A | 11/2000 | Starnes et al. |
| 6,147,975 A | 11/2000 | Bowman-Amuah |
| 6,154,776 A | 11/2000 | Martin |
| 6,163,541 A * | 12/2000 | Casey et al. ........... 370/395.51 |
| 6,167,049 A | 12/2000 | Pei et al. |
| 6,172,991 B1 * | 1/2001 | Mori ..................... 370/389 |
| 6,195,697 B1 | 2/2001 | Bowman-Amuah |
| 6,201,971 B1 | 3/2001 | Purnadi et al. |
| 6,223,292 B1 | 4/2001 | Dean et al. |
| 6,269,396 B1 | 7/2001 | Shah et al. |
| 6,272,544 B1 | 8/2001 | Mullen |
| 6,285,674 B1 * | 9/2001 | Soni et al. .................. 370/390 |
| 6,285,684 B1 | 9/2001 | Suzuki et al. |
| 6,311,212 B1 | 10/2001 | Chong et al. |
| 6,311,238 B1 | 10/2001 | Hebert |
| 6,337,863 B1 * | 1/2002 | Nair et al. ............. 370/395.53 |
| 6,343,078 B1 * | 1/2002 | Bronstein et al. ........... 370/400 |
| 6,411,625 B1 * | 6/2002 | Furuhashi et al. ..... 370/395.53 |
| 6,425,067 B1 | 7/2002 | Chong et al. |
| 6,452,923 B1 | 9/2002 | Gerszberg et al. |

OTHER PUBLICATIONS

F. Chiussi et al., "Virtual Queueing Techniques for ABR Service: Improving ABR/VBR Interaction," IEEE INFOCOM '97, Sixteenth Annual Joint Conference of the IEEE Computer and Communications Societies.

Proceedings Volume 2, Apr. 7–12, 1997, pp. 406–418, IEEE Computer Society Press, Los Alamitos, California, USA.

Ghani et al., "Hierarchical Scheduling for Integrated ABR–VBR Services in ATM Networks", Globecom 97, IEEE Global Telecommunications Conference; pp. 779–784.

Lin, Dong; Constant–Time Dynamic ATM Bandwidth Scheduling for Guaranteed and Best Effort Services with Overbooking: IEEE INFOCOM '97; pp. 398–405.

Benmohamed et al., "A Control–Theoretic ABR Explicit Rate Algorithm for ATM Switches with PER–VC Queuing", IEEE INFOCOM '98 pp. 183–191.

* cited by examiner

SYSTEM AND METHOD FOR PERFORMING CUT-THROUGH FORWARDING IN AN ATM NETWORK SUPPORTING LAN EMULATION

CROSS-REFERENCES TO RELATED APPLICATIONS

This application claims priority from U.S. Provisional Patent Application No. 60/090, 939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims priority from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are being filed concurrently, and the disclosure of each other application is hereby incorporated by reference in its entirety into this application for all purposes:

Patent Application Ser. No. 09/344,640, entitled "METHOD AND APPARATUS FOR CONTROLLING A NETWORK PROCESSOR," filed Jun. 25, 1999;

Patent Application Ser. No. 09/344,608, entitled "SYSTEM AND METHOD FOR PERFORMING CUT-THROUGH FORWARDING IN AN ATM NETWORK SUPPORTING LAN EMULATION," filed Jun. 25, 1999;

Patent Application Ser. No. 09/337,025, entitled "APPLICATION PROGRAMMING INTERFACES AND METHODS ENABLING A HOST TO INTERFACE WITH A NETWORK PROCESSOR," filed Jun. 25, 1999;

Patent Application Ser. No. 09/344,820, entitled "CBR/VBR TRAFFIC SCHEDULER," filed Jun. 25, 1999;

Patent Application Ser. No. 09/344,672, entitled "MULTI-PROTOCOL CONVERSION ASSISTANCE METHOD AND SYSTEM FOR A NETWORK ACCELERATOR," filed Jun. 25, 1999;

Patent Application Ser. No. 09/340,282, entitled "SYSTEMS AND METHODS FOR IMPLEMENTING POINTER MANAGEMENT," filed Jun. 25, 1999;

Patent Application Ser. No. 09/340,068, entitled "SYSTEM FOR MULTI-LAYER BROADBAND PROVISIONING IN COMPUTER NETWORKS," filed Jun. 25, 1999; and Patent Application Ser. No. 09/344,453, entitled "NETWORK ACCELERATOR SUBSYSTEM BASED ON SINGLE-CHIP NETWORK PROCESSOR AND INTERFACE PROTOCOL," filed Jun. 25, 1999.

Additionally, the disclosure of each of the following pending patent applications is hereby incorporated by reference in its entirety into this application for all purposes:

Patent Application Ser. No. 09/335,223, entitled "SYSTEMS AND METHODS FOR IMPLEMENTING ABR WITH GUARANTEED MCR," filed Jun. 17, 1999; and Patent Application Ser. No. 09/270,287, entitled "SYSTEMS AND METHODS FOR ON-CHIP STORAGE OF VIRTUAL CONNECTION DESCRIPTORS," filed Mar. 16, 1999.

BACKGROUND OF THE INVENTION

The present invention relates generally to computer networks and more particularly to techniques for performing high speed forwarding of traffic in an ATM network providing local area network emulation (LANE) services.

The Local Area Network Emulation (LANE) standard/protocol emulates a local area network (LAN) over an Asynchronous Transfer Mode (ATM) network. LANE thus allows existing LAN software applications to take advantage of the high bandwidth and quality of service offered by ATM networks without having to make significant changes to the LAN software applications. LANE allows ATM equipment and networks to be interconnected to existing LANs, and further allows logically separate LANs to be connected via an ATM backbone network. An emulated LAN (ELAN) provides for the communication of data frames among all users of the ELAN similar to a physical LAN.

Presently, LANE emulates either a Ethernet/IEEE 802.3 LAN or a IEEE 802.5 (Token Ring) type LAN. An emulated LAN typically comprises at least one LAN emulation client (LEC), a LAN emulation server (LES), a LAN emulation configuration server (LECS), and a broadcast and unknown server (BUS). The aforementioned components are logical entities and may be implemented in a single physical unit or in separate physical units.

A LEC represents one or more users requiring LAN emulation services. A LEC may be an end workstation, a switch, a network interface card, or even an ATM bridge connecting an ATM network to a legacy LAN. A LEC provides data forwarding, address resolution, and other networking functions for its associated end users. A LEC is generally identified by a LEC identifier (LEC ID) which is unique to the LEC within the network. A LEC is generally assigned to a LES. Communications between LECs are usually performed over ATM virtual channel connections (VCCs).

A LES implements the control coordination function for an emulated LAN. An LES provides address registration services allowing participants of an emulated LAN to register their media access control (MAC) and ATM addresses. An LES also provides address resolution services by implementing the address resolution protocol (ARP) which facilitates conversion between MAC and ATM addresses. A LEC typically queries the LES to which it is assigned to resolve MAC addresses. Communication between a LEC and a LES is usually performed over control VCCs established between the LEC and the LES. Each emulated LAN typically has one LES.

A LECS provides configuration services for the emulated LAN including assignment of individual LECs to various emulated LANs by giving the LECs the ATM address of an LES associated with the particular emulated LAN along with necessary operating parameters such as the type of the emulated LAN and the maximum frame size. A network typically has one LECS.

A BUS handles broadcasts and multicasts in the network. Data frames are generally sent to the BUS when either the information is to be transferred to workstations in the emulated LAN or when a source LEC has sent an ARP request to the LES, but does not wish to wait for a response before starting the data transfer to the destination LEC.

In order to route data frames from a source to a destination in an emulated LAN, each participant of the emulated LAN, for example, workstations, switches, network interface cards, and bridges, implements a LAN emulation protocol stack which performs the functions necessary to communicate the data frames from the source to the destination. A LAN emulation protocol stack is made of one or more protocol layers which provide services for communicating information to the appropriate destination. The functions corresponding to the protocol stack are generally executed by a microprocessor associated with the emulated LAN participant equipment.

With the ever increasing amount of pipe bandwidth available for data communication, it is desired that the protocol stack processing be performed at broadband speeds. For example, LAN traffic generated by 100 Bbps and Gigabit Ethernet migration are now required to fill multiple OC-3 or OC-12 SONET backbones in corporate enterprises. High-end routers are required to be able to feed OC-12 (622 Mbps) SONET pipes and OC-48 (2.4 Gbps) SONET pipes with millions of small packets per second.

Unfortunately, conventional protocol stack processing has been unable to proportionately scale with increasing bandwidth requirements. As a result, the slower processing speeds associated with protocol stack processing reduce the efficiency of bandwidth usage. Thus, there is a need for a technique which reduces the time associated with protocol stack routing and improves bandwidth usage in an emulated LAN network environment.

SUMMARY OF THE INVENTION

The present invention provides techniques to reduce the time associated with protocol stack routing in an emulated LAN network environment. According to the teachings of the present invention, a technique is described for performing cut-through forwarding of LAN emulation (LANE) packets without incurring the overhead associated with LANE protocol stack assisted routing. The teachings of the present invention may be used for performing cut-through forwarding of packets received from an Ethernet (including a Gigabit Ethernet) and outbound to the ATM network, or of packets received from the ATM network and outbound to the Ethernet (including a Gigabit Ethernet). The routing of LANE packets can accordingly be achieved in an expedited manner approaching broadband speeds.

According to an aspect of the present invention, a network processor coupled to an Ethernet and an ATM network supporting LANE services is responsible for performing cut-through forwarding of packets received from the Ethernet and outbound to the ATM network. In one embodiment, the network processor uses information contained in the header of the packet to determine if the packet is of type LANE or virtual LAN (VLAN). If the packet is of type LANE or VLAN, the network processor uses the VLAN ID in the packet header to determine the LANE emulation client (LEC) identifier (LEC ID) for the packet. The network processor also determines the virtual channel connection (VCC) information for the packet based on the medium access address (MAC) address contained in the packet header. The network processor may then use the LEC ID and the VCC information to forward the packet to its destination without having to go through protocol stack assisted routing.

According to another aspect of the present invention, the network processor stores LEC information for the LECs coupled to the ATM network. The LEC information contains LEC IDs for the LECs along with the VLAN IDs. Accordingly, in one embodiment, the present invention determines the LEC ID for the packet by using the VLAN ID of the packet as an index to the LEC information. The LEC ID may then be used for packet forwarding according to the teachings of the present invention.

According to yet another aspect of the present invention, the network processor stores LEC up-link information which facilitates mapping of MAC addresses to VCC information.

In one embodiment, this information is stored in a content addressable memory (CAM) coupled to a packet forwarding subsystem within the network processor. In order to determine VCC information for the packet, the packet forwarding subsystem uses the MAC address of the packet as an input for CAM lookup. If the output of the CAM lookup indicates a hit, the CAM lookup output is used to determine the VCC information. In one embodiment, the CAM lookup output acts as an index to the VCC information for the input MAC address. The VCC information may then be used by the network processor for packet forwarding according to the present invention.

According to yet another aspect of the present invention, a network processor coupled to an Ethernet and an ATM network supporting LANE services is responsible for performing cut-through forwarding of packets received from an ATM network and outbound to the Ethernet. In one embodiment, the network processor uses information contained in the header of the packet to determine the interface address for the packet. Based on the interface address, the network processor determines if the destination of the packet is the network processor. If so, the packet is queued to the processor of the network processor for further processing. If the network processor is not the destination, the network processor forwards the packet to its destination via the Ethernet.

According to another aspect of the present invention, the network processor performs echo suppression to determine if the packet is a echo or loopback packet. The packet may be discarded if it is an echo or loopback packet. If the packet is not a loopback or echo packet, the packet is forwarded via the Ethernet. In one embodiment, echo suppression is achieved by comparing the LEC ID of the packet with the LEC ID stored in the LEC information corresponding to the packet. If the two LEC IDs are the same, this indicates a loopback or echo packet, and the packet is accordingly discarded.

According to yet another aspect of the present invention, the network processor may perform 801.1q tag discovery to determine the tag associated with the packet. Based on the tag, the network processor then determines if the packet violates any ingress policy. The packet may be discarded if an ingress policy is violated.

According to still another aspect of the present invention, the network processor adds a 802.1q tag to non-tagged packets. The network processor may then perform spanning tree detection based on the packet. The packet may then be forwarded based on the results of the spanning tree detection.

Other aspects and advantages of the invention will be better understood by reference to the following detailed description and the accompanying figures.

DESCRIPTION OF THE SPECIFIC EMBODIMENTS

Figure 1:
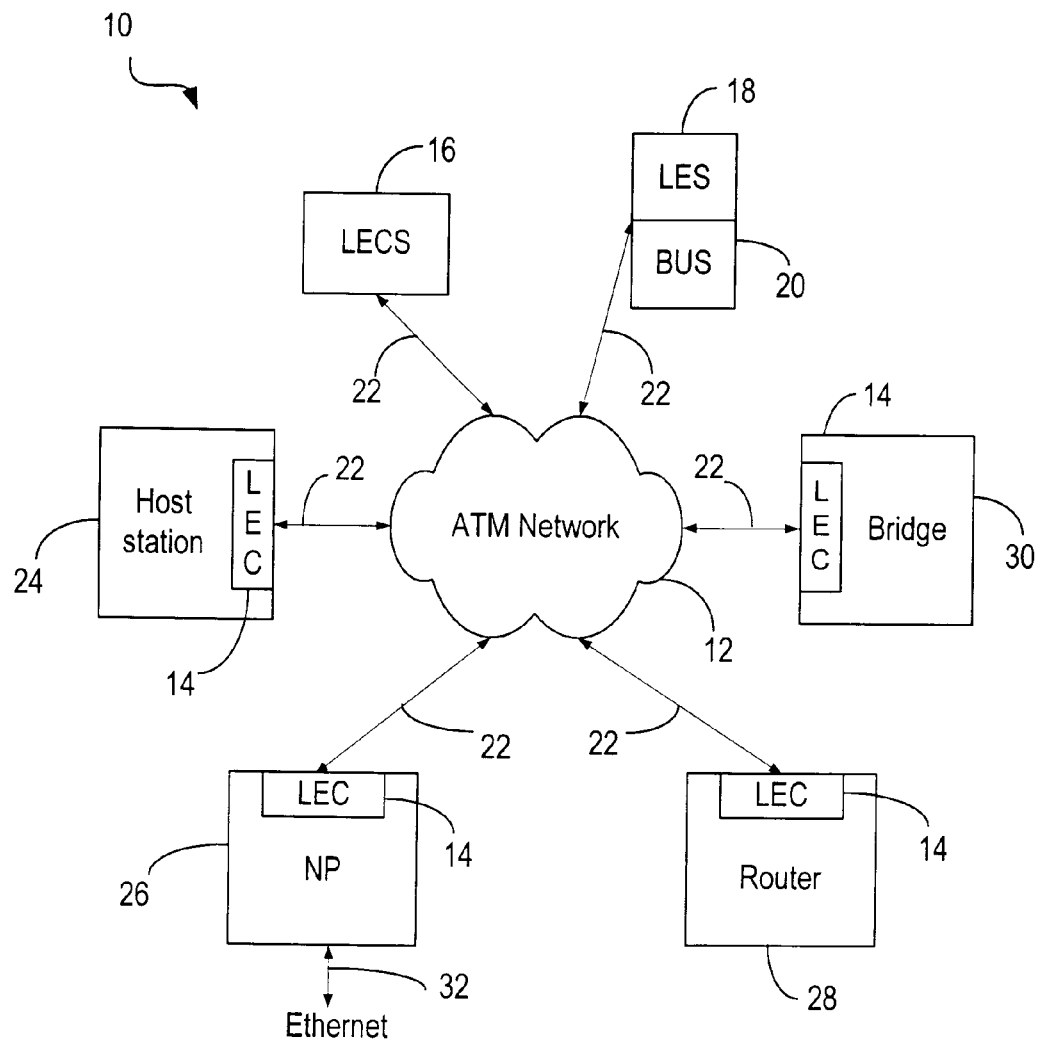
FIG. 1 depicts a simplified block diagram of an emulated LAN over an ATM network incorporating an embodiment of the present invention.

FIG. 1 is a simplified block diagram of an emulated LAN 10 over an ATM network 12 incorporating the teachings of the present invention. Emulated LAN 10 comprises a plurality of LECs 14, an LECS 16, an LES 18, and a BUS 20 coupled with ATM network 12 via communication links 22. LES 18 and BUS 20 are depicted as coupled together because they usually coexist in an emulated LAN environment. Each LEC 14 is part of an ATM end station which may be a network processor (NP) 26 incorporating the present invention, a router 28, a bridge 30, or any other ATM host workstation 24.

According to the teachings of the present invention, network processor 26 provides techniques for bypassing conventional processor-implemented conventional LANE protocol stack related routing by performing cut-through forwarding of LANE traffic. As a result, the present invention not only reduces the time associated with LANE routing but also reduces the computational load on the processor of network processor 26. In one embodiment, as shown in FIG. 1, network processor 26 is coupled to ATM network 12 via ATM communication link 22 and is also coupled to an Ethernet/Token Ring (including Gigabit Ethernet) network via communication link 32.

Figure 2:
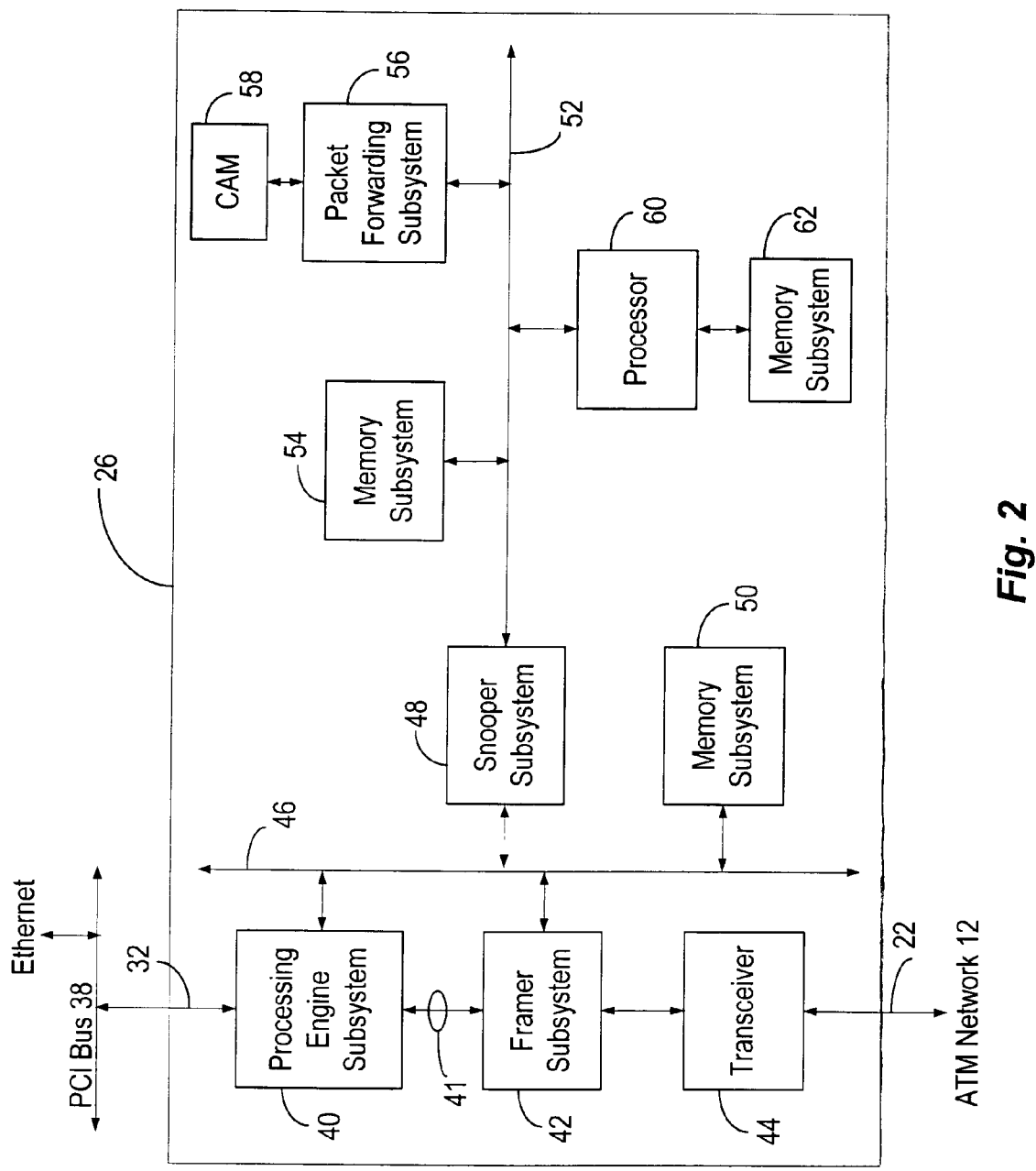
FIG. 2 depicts a simplified block diagram of a network processor according to an embodiment of the present invention.

FIG. 2 depicts a simplified block diagram of network processor (NP) 26 according to an embodiment of the present invention. In the embodiment depicted in FIG. 2, network processor 26 is coupled with the Ethernet/Token Ring network via a PCI bus 38. In one embodiment, network processor 26 includes a number of memories and subsystems coupled to a first internal bus 46 and a second internal bus 52. The subsystems coupled with first internal bus 46 may include a processing engine subsystem 40, a framer subsystem 42, a transceiver 44, a snooper subsystem 48, and memory subsystem 50. Subsystems coupled with second internal bus 52 may include a processor 60 along with its associated memory subsystem 62, a second memory subsystem 54, and a packet forwarding subsystem 56 coupled to a content addressable memory (CAM) 58. Internal buses 46 and 52 provide a mechanism allowing the various subsystems of network processor 26 to communicate with one another as intended.

Memory subsystems 50, 54, and 62 may include a number of memories including random access memories (RAMs) such as synchronous dynamic random access memory (SDRAM) and synchronous static random access memory (SSRAM). Memory subsystem 62 may also include flash memories for storing software images which may be executed by processor 60. Memory subsystems 50 and 54 provide storage facilities for software modules and other data constructs used by the present invention and those needed by network processor 26 to perform its functions. In one embodiment, memory subsystem 50 provides storage for data packets received by NP 26 from ATM network 12 and from the Ethernet/Token Ring network.

Processing engine subsystem 40 provides processing services for a broad range of high speed network traffic types, including frames, cells, and packets at high data rates, for example, 622 Mbps full duplex. Processing engine subsystem 40 provides an industry standard PCI (e.g. 64 b-bit) and memory (e.g. 64-bit) interface. In one embodiment, processing engine subsystem 40 also provides an industry standard UTOPIA interface 41 for direct coupling with a broad range of Layer 1 physical interfaces. Processing engine subsystem 40 integrates Layer 2 functions and provides extensive hardware assist for processor 60 or packet forwarding subsystem 56 or Layer 3 functions for a variety of high speed network protocols.

Integrated functionality includes providing ATM interfaces for a packet switching core, providing packet interfaces for an ATM switching core, providing LEC functionality, providing multi-protocol over ATM client (MPC) functionality, memory management, system-level buffering, providing a flexible traffic scheduler, ATM Segmentation and Re-assembly (ATM SAR) functionality, Multi-Protocol Over ATM (MPOA) support, LANE support, tagging, multi-protocol label switch (MPLS) functionality, and raw packet format processing assist, hardware encapsulation and direct memory access (DMA) control. Processing engine subsystem 40 supports a broad range of applications executing on various access platforms, multi-protocol routers, internet protocol (IP), ATM and workgroup switches, and Gigabit Ethernet platforms. Processing engine subsystem 40 uses hardware-based state machines to obtain enhanced operation speed. There is no local processor within processing engine subsystem 40 in the path of any cell or packet transaction to slow down the operation of the system.

Transceiver 44 receives and transmits ATM traffic to ATM network 12 via communication link 22. In one embodiment, transceiver 44 is a fiber-optic transceiver. Framer subsystem 42 creates cells from data stream received via ATM SONET framing via transceiver 44. Alternatively, framer subsystem 42 converts cells to data bit streams. Memory subsystem 50 provides memory resources for processing performed by processing engine subsystem 40. The ATM or Ethernet packets received by network processor 26 are usually written to memory subsystem 50.

Snooper subsystem 48 is coupled both to first internal bus 46 and second internal bus 52, and provides a bridge between the two internal buses. In one embodiment, snooper subsystem 48 "snoops" or extracts the headers of packets written to memory subsystem 50 and makes them accessible to packet forwarding subsystem 56 and processor 60 by writing them to memory subsystem 54. The snooped headers can then be accessed by processor 60 or by packet forwarding subsystem 56 for further processing.

Packet forwarding subsystem 56 provides the hardware assist for processing of data frames and packets in order to achieve broadband data path speed. In one embodiment, packet forwarding subsystem 56 is a re-programmable hardware device which may be configured to process Ethernet, voice, carrier access, LANE, or customer specific traffic types. According to an embodiment of the present invention, packet forwarding subsystem 56 performs functions to facilitate cut-through forwarding or switching of LANE traffic.

CAM 58 coupled with packet forwarding subsystem 56 facilitates the cut-through forwarding process according to an embodiment of the present invention. In one embodiment CAM 58 stores LEC uplink information which provides mapping of MAC destination addresses to virtual channel connections (VCCs) and vice versa. The LEC uplink information is usually set up and maintained by processor 60. CAM 58 is generally a hardware lookup table.

Processor 60 executes the system and application level functions, including LANE, user network interface (UNI), interim local management interface (ILMI), or slow path protocol stack assisted forwarding applications. This includes applications for controlling the functionality of network processor 26. The software modules corresponding to the applications are generally stored in memory subsystem 62. In alternate embodiments, the software modules may be stored in any other memory accessible to processor 60 such as memory subsystem 54. Memory subsystem 54 provides memory resources for processing performed by processor 60 and packet forwarding subsystem 56. In one embodiment, memory subsystem 54 stores a LEC information table which contains information for the various LECs 14 supported in emulated LAN 10. The information stored in the LEC information table for the LECs may include a virtual LAN identifier (VLAN ID), a BUS identifier (BUS ID), a LEC identifier (LEC ID), tag value indicating the 802.1q VLAN tag, a valid bit indicating if the information contained in the record is current, and a block value which when set to TRUE indicates that the cut-through process according to the present invention will filter out data packets and allow only spanning tree traffic to pass to ATM or Gigabit/PCI interfaces. The LEC information table is maintained and updated by processor 60 and is used by packet forwarding subsystem 56 and processor 60 for providing routing functionality. As new LECs are added or deleted from emulated LAN 10, processor 60 updates the LEC information table to reflect the current state of the emulated LAN.

Figure 3:
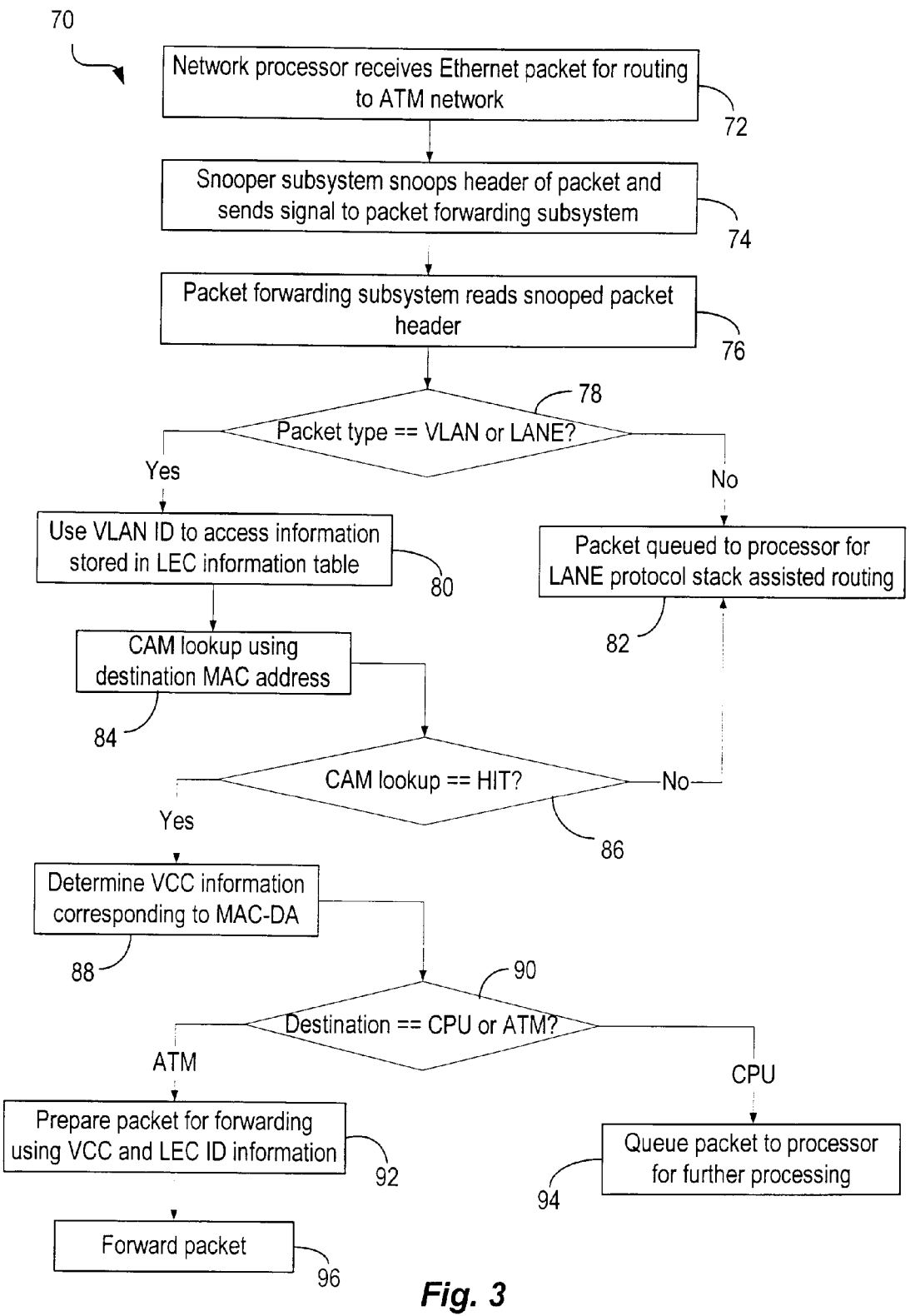
FIG. 3 is a flowchart depicting steps for performing cut-through LANE forwarding of a packet received via the Ethernet and outbound to the ATM network according to an embodiment of the present invention.

FIG. 3 is a flowchart 70 depicting steps for performing cut-through forwarding of Ethernet packets via ATM network 12 according to an embodiment of the present invention. The flowchart steps are initiated when network processor 26 receives an Ethernet packet for routing via the ATM network (step 72). After processing the received packet, processing engine subsystem 40 writes the packet to memory subsystem 50. In one embodiment, processing engine subsystem 40 also writes a receive packet report to memory subsystem 50.

Snooper subsystem 48 then snoops or extracts the header from the packet written to memory subsystem 50 and writes the packet header to memory subsystem 54 (step 74). The information contained in the packet header generally includes a source MAC address, a destination MAC address, a virtual LAN (VLAN) tag, a packet type and a VLAN identifier (VLAN ID). In alternate embodiments of the present invention, the packet header may contain more or less information. In one embodiment of the present invention, snooper subsystem 48 also snoops the receive report from memory subsystem 50 to memory subsystem 54. After the packet header and/or the receive report have been snooped to memory subsystem 54, snooper subsystem 48 sends a signal to packet forwarding subsystem 56 indicating that the packet header and/or receive report has been written to memory subsystem 54.

Packet forwarding subsystem 56 then reads the snooped header from memory subsystem 54 (step 76). Packet forwarding subsystem 56 examines the packet type/length field from the snooped header and determines if the packet type is of type virtual LAN (VLAN) or LANE (step 78). In one embodiment a tag value of 0x8100 indicates that the packet is of type VLAN or LANE. If the packet is not of type VLAN or LANE, the packet is queued to processor 60 or to other protocol assist hardware for LANE protocol stack assisted routing (step 82).

According to an embodiment of the present invention, if the packet is of type VLAN or LANE, the VLAN ID from the packet header is used to access information stored in the LEC information table in memory subsystem 54 (step 80). The valid field and block field from the accessed information are then checked by packet forwarding subsystem 56. If the record is valid and not blocked, the destination MAC address from the packet header is input to CAM 58 for lookup (step 84). If the CAM lookup (step 86) results in a miss, packet forwarding subsystem 56 queues the packet to processor 60 or to other protocol assist hardware for LANE protocol stack assisted routing (step 82).

If the CAM lookup is a hit, the information returned by the CAM lookup is used to determine virtual channel connections (VCC) information for the MAC destination address of the packet (step 88). In one embodiment, the CAM hit returns an index which is used to retrieve address resolution protocol information (ARP_info) stored in memory subsystem 54. In other embodiments, the CAM hit may itself return the VCC information for the packet. The ARP_info is generally set up and maintained by processor 60. In one embodiment, ARP_info contains VCC information, count information, and a CPU bit, corresponding to the MAC destination address in the packet header. The count information is incremented by one every time a packet destination MAC address and VLAN ID are resolved from the LEC up-link table stored by CAM 58. The CPU bit, if set, allows the cut-through process to forward control packets to processor 60 which has a unique MAC and VLAN ID which are pre-registered into CAM 58 during configuration time. The ARP_info is updated by processor 60 once VCC information has been determined for a particular MAC destination address via LANE protocol assisted routing. Each LEC may have multiple ARP_info entries associated with it.

Based on the VCC information in ARP_info, and the LEC ID retrieved from the LEC information table, packet forwarding subsystem 56 is able to determine the destination for the packet. The LEC ID information in conjunction with the VCC information enables network processor 26 to forward the packet to the appropriate destination. If the destination is processor 60 (step 90), the packet is queued to processor 60 for further processing (step 94).

If the destination is not processor 60 but another LEC connected to ATM network 12, or if the CPU bit is not set in ARP_info, packet forwarding subsystem 56 prepares the packet for forwarding to the destination based on the VCC and LEC ID information (step 92). As part of the step 92, packet forwarding subsystem 56 may write the packet header back to memory subsystem 50. In one embodiment, the LEC ID retrieved from the LEC information table may be prepended to the packet header by processing engine subsystem 40 using the ADD_PACKET command. If the tag field is "0" in the LEC information table record, four 802.1q tag bytes maybe untagged from the packet header. Preparation may also involve determining whether the packet is multicast, broadcast, or unicast, and updating the packet count statistics for the destination LEC. An add packet procedure for AAL transmit service is then performed on the packet using the VCC information retrieved from ARP_info and LEC ID information. The packet is then forwarded to the destination via ATM network 12 (step 96).

Figure 4:
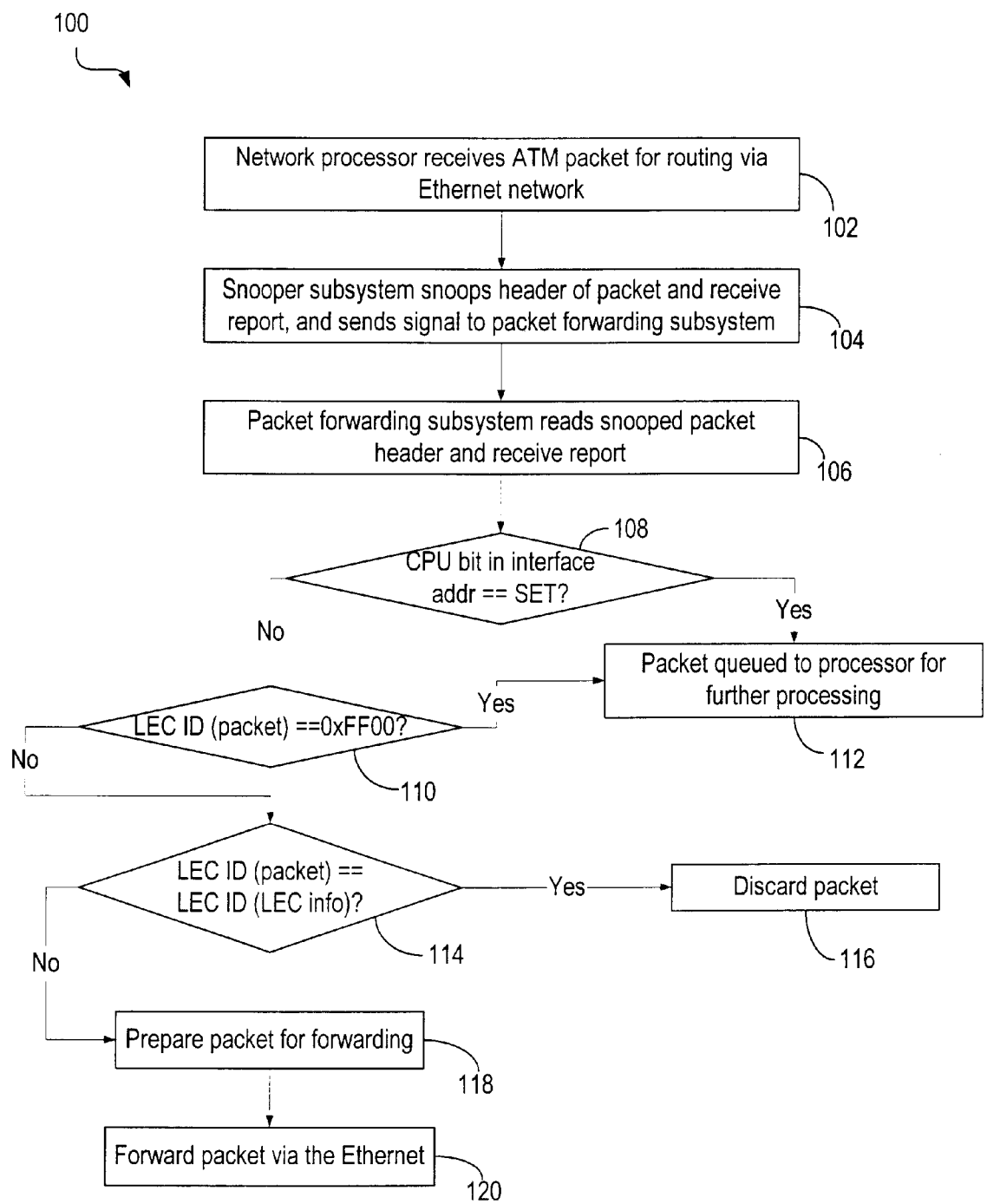
FIG. 4 is a flowchart depicting steps for performing cut-through LANE forwarding of a packet received via the ATM network and outbound to the Ethernet according to an embodiment of the present invention.

FIG. 4 is a flowchart 100 depicting steps for performing cut-through forwarding of a packet received via ATM network 12 and outbound to Ethernet according to an embodiment of the present invention. The flowchart steps are initiated when network processor 26 receives an ATM packet for routing via transceiver 44 (step 102). After processing the received packet, processing engine subsystem 40 writes the packet to memory subsystem 50. A receive report is also written by processor engine subsystem 40 to memory subsystem 50. In one embodiment, the receive report comprises two parts including a buffer report and a packet report. In one embodiment, the buffer report contains information on the receive virtual circuit descriptor address, a receive buffer address, a pool identifier, buffer size, status, and report code. In one embodiment, the packet report, in addition to other information, contains information on packet length, receive descriptor address, processor information, error correction information, a valid bit field, and the interface address of the packet.

Snooper subsystem 48 then snoops the receive report and the packet header from memory subsystem 50 to memory subsystem 54 (step 104). Snooper subsystem 48 also sends a signal to packet forwarding subsystem 56 indicating that the receive report and packet header have been written to memory subsystem 54.

Packet forwarding subsystem 56 then reads the snooped receive report from memory subsystem 54 (step 106). Packet forwarding subsystem 56 then determines if the CPU bit in the interface address of the packet stored in the snooped packet report is set (step 108). If the CPU bit is set, packet forwarding subsystem 56 forwards the packet to processor 60 for further processing which may include protocol stack assisted routing (step 112). If the CPU bit is not set, packet forwarding subsystem 56 then determines if the packet is a control packet by checking if LEC ID of the packet is equal to 0xFF00 (step 112). All LEC control packets received from the ATM network contain a LEC ID of 0xff00 in first 2 bytes of the packet. If the packet LEC ID is equal to 0xFF00, the packet is forwarded to processor 60 for further processing.

If the LEC ID is not equal to 0xFF00, packet forwarding subsystem 56 then performs echo suppression to determine if the packet has been echoed back or loop backed to NP 26. To perform echo suppression, packet forwarding subsystem 56 compares the LEC ID of the packet to the LEC ID stored in the LEC information table indexed by the interface address of the packet (step 114). If the two LEC IDs are the same, it implies that the packet has been echoed back, and is accordingly discarded (step 116). If the packet is not an echoed packet, the packet is then prepared for forwarding via the Ethernet (step 118).

Figure 5:
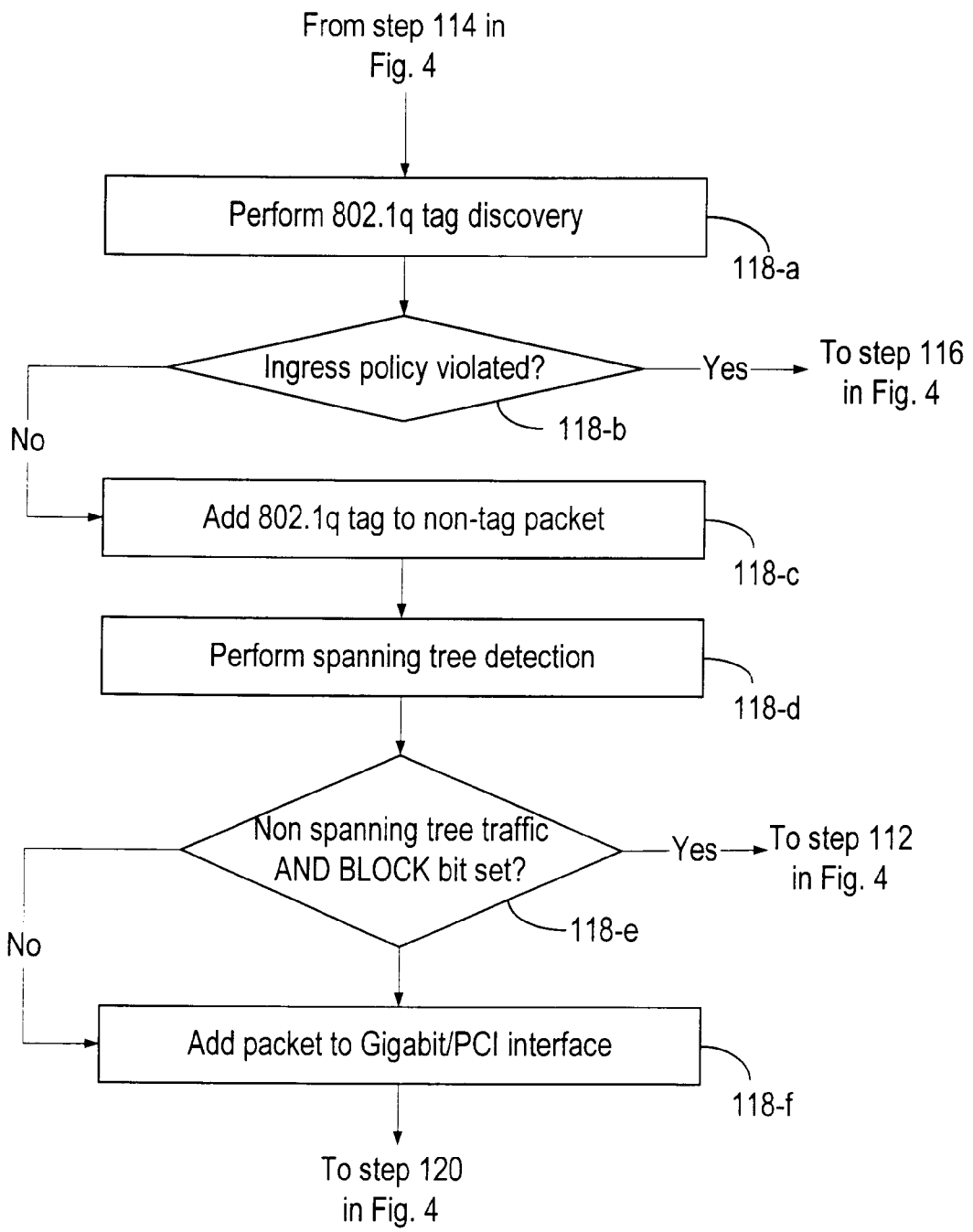
FIG. 5 is a flowchart depicting steps for preparing a packet for forwarding via the Ethernet according to an embodiment of the present invention.

FIG. 5 is a flowchart depicting the steps which may be performed as part of preparing the packet for Ethernet forwarding according to step 118 in FIG. 4. As part of the preparation process, packet forwarding subsystem 56 may perform 802.1q tag discovery to determine the tag associated with the packet (step 118-*a*). Based on the tag determined in step 118-*a*, packet forwarding subsystem 56 may determine if the packet violates any ingress policy (step 118-*b*). If the ingress policy is deemed violated, the packet may be discarded according to step 116 in FIG. 4. If the ingress policy is not violated, packet forwarding subsystem 56 may add a 802.1q tag to packets without tags based on the interface address of the packet (step 118-*c*). Packet forwarding subsystem 56 then may perform spanning tree detection for Layer 2 loop detection (step 118-*d*). Based on the results from step 118-*d*, packet forwarding subsystem 56 determines if the packet is a non-spanning tree traffic packet, and if the BLOCK bit is set in the LEC information table for the packet (step 118-*e*). If the packet is a non-spanning tree traffic packet and BLOCK bit is set, the packet may be forwarded to processor 60 for further processing (step 112 in FIG. 4). Else, the packet may be added to the PCI or Gigabit interfaces for forwarding purposes (step 118-*f*). This allows spanning tree packe traffic to be forwarded as usual o even if the LEC is in the BLOCK state. The packet is then forwarded to its destination via the Ethernet (step 120 in FIG. 4).

The steps depicted in flowcharts 70 and 100 enable forwarding of packets received from an Ethernet and outbound to the ATM network or forwarding or packets received from an the ATM network and outbound to the Ethernet (including a Gigabit Ethernet) using cut-through processing according to the teachings of the present invention. Cut-through processing enables routing of packets without incurring the overhead associated with conventional LANE protocol assisted processing performed by a processor. Accordingly, the routing of packets can be performed in an expedited manner approaching broadband speeds, for example OC-12.

Although specific embodiments of the invention have been described, various modifications, alterations, alternative constructions, and equivalents are also encompassed within the scope of this application. For example, the structure of network processor 26 is not limited to the embodiment shown in FIG. 2. Alternate configurations of network processor 26 having more or less subsystems than the embodiment depicted in FIG. 2 are also within the scope of the present invention. In other embodiments, the subsystems of network processor 26 may be combined into one or more subsystems. For example, memory subsystems 50 and 54 may be combined into one memory subsystem. Further, the names given to the subsystems do not in any way limit the functional scope of the subsystems.

The described invention is not restricted to operation within certain specific data processing environments, but is free to operate within a plurality of data processing environments. Additionally, although the present invention has been described using a particular series of transactions and steps, for example, the flowcharts depicted in FIGS. 3, 4, and 5, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network including a processing device coupled to an asynchronous transfer mode (ATM) network and an Ethernet network, the ATM network configured to provide local area network emulation (LANE) services, a method for forwarding a packet received by the processing device from the Ethernet network, comprising:

reading header information from a header of the received packet, the header information including a packet type, a destination media access control (MAC) address, and a virtual LAN identifier (VLAN ID);

storing in a memory coupled with the processing device LANE emulation client (LEC) information for LECS coupled with the ATM network, the LEC information including LEC IDs for the LECs;

determining if the packet type is of type LANE or virtual LAN (VLAN); and if packet type is of type LANE or VLAN:
  determining a LEC ID for the packet from the LEC information based on the VLAN ID;
  determining virtual channel connection (VCC) information corresponding to the destination MAC address of the packet; and
  forwarding the packet to its destination based on the VCC information and the LEC ID for the packet.

2. The method of claim 1, wherein the processing device includes a content addressable memory (CAM), the method farther comprising:
  storing LEC uplink information in the CAM, the LEC uplink information including information facilitating determination of VCC information for a MAC address; and
  wherein determining the VCC information corresponding to the destination MAC address of the packet includes:
    performing a CAM lookup for VCC information using the destination MAC address of the packet as input; and
    if the CAM lookup finds the destination MAC address, providing the corresponding VCC information for use in forwarding the packet.

3. The method of claim 1, wherein forwarding the packet to its destination farther comprises:
  determining, based on the VCC information and the LEC ID for the packet, if the destination of the packet is a processor of the processing device; and
  if the processor of the processing device is the destination, forwarding the packet to the processor, else forwarding the packet to its destination via the ATM network.

4. The method of claim 3, wherein forwarding the packet to its destination via the ATM network farther comprises inserting the LEC ID for the packet into the packet header before forwarding the packet to the destination.

5. In a network including an ATM network configured to provide local area network emulation (LANE) services, a network processor coupled to the ATM network and an Ethernet network for forwarding a packet received from the Ethernet, comprising:
  a processing engine subsystem configured to receive the packet and store it in a memory;
  a packet forwarding subsystem;
  a bus subsystem for coupling said packet forwarding subsystem to said memory;
  the memory configured to store the packet received from the Ethernet networks, the memory further configured to store LANE emulation client (LEC) information for LECs coupled with the ATM network, the LEC information including LEC IDs for the LECs;
  the packet forwarding subsystem configured to read header information from a header of the received packet stored in the memory, the header information including a packet type, a destination media access control (MAC) address, and a virtual LAN identifier (VLAN ID);
  the packet forwarding subsystem further configured to determine if the packet type is of type LANE or virtual LAN (VLAN); and
  if packet type is of type LANE or VLAN, the packet forwarding subsystem further configured to:
    determine a LEC ID for the packet from the LEC information based on the VLAN ID;
    determine virtual channel connection (VCC) information corresponding to the destination MAC address of the packet; and
    forward the packet to its destination based on the VCC information and the LEC ID for the packet.

6. The network processor of claim 5, further comprising:
  a content addressable memory (CAM) coupled with the packet forwarding subsystem, the CAM configured to store mapping between MAC addresses and VCC information; and
  wherein in order to determine the VCC information corresponding to the destination MAC address of the packet, the packet forwarding subsystem is configured to:
    perform a CAM lookup for VCC information using the destination MAC address of the packet as input; and
    if the CAM lookup finds the destination MAC address, provide the corresponding VCC information for use in forwarding the packet.

7. The network processor of claim 5, wherein the packet forwarding subsystem is further configured to determine, based on the VCC information and the LEC ID for the packet, if the destination of the packet is the processor of the network processor; and if the processor of the network processor is the destination, the packet forwarding subsystem is configured to forward the packet to the processor, else to forward the packet to its destination via the ATM network.

8. The network processor of claim 7, wherein in order to forward the packet to its destination via the ATM network, the packet forwarding subsystem is configured to insert the LEC ID for the packet into the packet header stored in the memory before forwarding the packet to the destination.

9. In a network including a processing device coupled to an asynchronous transfer mode (ATM) network and an Ethernet network, the ATM network configured to provide local area network emulation (LANE) services, a computer-readable medium containing instructions for forwarding a packet received by the processing device from the Ethernet, comprising:
  instructions for reading header information from a header of the received packet the header information including a packet type, a destination media access control (MAC) address, and a virtual LAN identifier (VLAN ID);
  instructions for storing in a memory coupled with the processing device LANE emulation client (LEC) information for LECs coupled with the ATM network, the LEC information including LEC IDs for the LECs;
  instructions for determining if the packet type is of type LANE or virtual LAN (VLAN);
  if packet type is of type LANE or VLAN:
    instructions for determining a LEC ID for the packet from the LEC information based on the VLAN ID;
    instructions for determining virtual channel connection (VCC) information corresponding to the destination MAC address of the packet; and
    instructions for forwarding the packet to its destination based on the VCC information and the LEC ID for the packet.

10. The computer-readable medium of claim 9, wherein the processing device includes a content addressable memory (CAM), the instructions further comprising:

instructions for storing LEC uplink information in the CAM, the LEC uplink information including information facilitating determination of VCC information for a MAC address; and wherein the instructions for determining the VCC information corresponding to the destination MAC address of the packet include instructions for:

performing a CAM lookup for VCC information using the destination MAC address of the packet as input; and if the CAM lookup finds the destination MAC address, providing the corresponding VCC information for use in forwarding the packet.

11. The computer-readable medium of claim 9, wherein the instructions for forwarding the packet to its destination further comprise:

instructions for determining, based on the VCC information and the LEC ID for the packet, if the destination of the packet is a processor of processing device; and if the processor of the processing device is the destination instructions for forwarding the packet to the processor, else forwarding the packet to its destination via the ATM network.

12. The computer-readable medium of claim 11, wherein the instructions for forwarding the packet to its destination via the ATM network further comprise instructions for inserting the LEC ID for the packet into the packet header before forwarding the packet to the destination.

* * * * *

UNITED STATES PATENT AND TRADEMARK OFFICE
CERTIFICATE OF CORRECTION

PATENT NO. : 6,728,249 B2
DATED : April 27, 2004
INVENTOR(S) : Chang

It is certified that error appears in the above-identified patent and that said Letters Patent is hereby corrected as shown below:

Column 10,
Line 65, delete "LECS" and insert -- LECs --.

Column 11,
Lines 13, 28 and 36, delete "farther" and insert -- further --.
Line 50, delete "networks" and insert -- network --.

Column 12,
Line 45, insert -- , -- after the word "packet".

Column 14,
Line 4, insert -- , -- at the end of the line.

Signed and Sealed this

Twenty-ninth Day of June, 2004

JON W. DUDAS
*Acting Director of the United States Patent and Trademark Office*